Nov. 5, 1929.　　　O. BRACKER　　　1,734,416

COCK OR TAP FOR CONTROLLING FLUIDS

Filed July 2, 1928

Inventor
Otto Bracker
By Henry Ortt Jr.
Atty.

Patented Nov. 5, 1929

1,734,416

UNITED STATES PATENT OFFICE

OTTO BRACKER, OF HANAU-ON-THE-MAIN, GERMANY

COCK OR TAP FOR CONTROLLING FLUIDS

Application filed July 2, 1928, Serial No. 289,903, and in Germany March 23, 1927.

This invention relates to a cock or tap for liquids, gases or vapors of all kinds of the type provided with a cock-plug in the form of a perforated sphere. The plug is connected with the operating means, for instance the handle of the cock, so loosely that the sphere can settle freely upon its seat. In the known devices of this kind, however, the seat bore of the cock is equal to or only immaterially larger than the bore in the spherical plug. This presents the disadvantage that, with rotation of the sphere, the edges of the plug bore catch on the edges of the seat bore and thus cause damage to the seating and to the plug.

This defect is avoided, according to the present invention, by making the bore of the seat in the cock housing for the sphere considerably larger than the bore in the sphere. Catching of the edges of the bore in the sphere on the seat bore is consequently, materially lessened. The substantially larger bore of the seat also gives the sphere a more reliable seat and prevents the sphere rising out of its seat when rotated.

Figure 1:
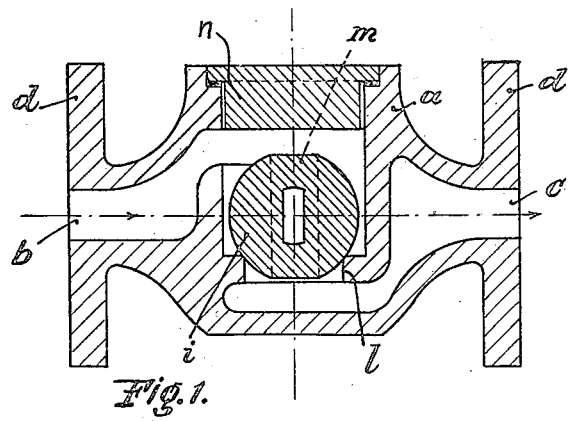

One embodiment of the invention is illustrated by way of example in the accompanying drawing in which:

Fig. 1 is a vertical section through the cock and

Figure 2:
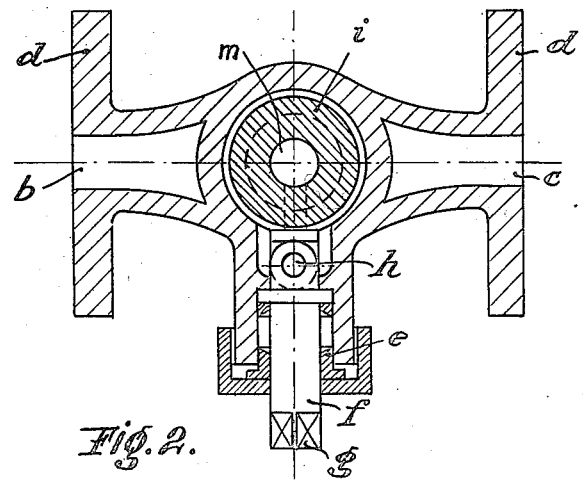

Fig. 2 a horizontal section thereof.

The cock housing is indicated by the reference letter $a$. The liquid or gas enters at $b$ and emerges at $c$. The cock is connected to any pipe or vessel or the like by flanges $d$.

A spindle $f$ on which a handle, handwheel or the like is secured at $g$ is guided and packed in a stuffing box $e$. In the interior of the housing the stem $f$ has a pivot pin $h$ that connects the sphere $i$ and the stem. The sphere constitutes the plug of the cock and is adapted to rest on the seat $l$ of the cock housing. The spherical plug $i$ is furnished with a bore $m$ for the passage of the liquid or gas from one part of the housing to the other.

This bore $m$ is of materially smaller diameter than the bore of the seat $l$ so that catching of the edges of the bore $m$ on the edges of the seat $l$ upon rotation of the sphere is prevented.

Since the valve stem $f$ is connected with the sphere $i$ by a pivot $h$, the sphere $i$ is capable of automatic adjustment on the seat $l$ and therefore always forms a good tight closure The spherical valve is inserted in the casing through an opening closed by a plug $n$.

What I claim is:

1. A cock or tap comprising a housing having a fluid inlet, a fluid outlet and a seat having a passage therethrough and a right angled seating surface a spherical plug having a substantially diametrical passage therethrough considerably smaller than the passage through said seat, a stem to rotate said plug, and a pivotal connection between the stem and plug to permit the latter to freely seat.

2. A cock or tap comprising a housing having a seat having a passage therethrough, a fluid inlet and a fluid outlet, a spherical plug having a diametrical passage therethrough considerably smaller than the passage through the seat in said housing, a stem for rotating the plug and a loose connection between the stem and plug to permit the plug to freely seat.

3. A cock or tap for controlling fluids comprising in combination, a housing with an inlet and an outlet for the fluid, a spherical plug having a diametrical passage therethrough and rotatable in said housing, a seat for the plug also having a passage therethrough, the passage through the seat being materially larger than the passage through the plug.

In testimony that I claim the foregoing as my invention, I have signed my name.

OTTO BRACKER.